(No Model.) 2 Sheets—Sheet 1.
A. C. MEADY & C. B. BOSWORTH.
APPARATUS FOR GRADUATING AND TESTING PRESSURE GAGES.

No. 408,808. Patented Aug. 13, 1889.

Witnesses.
W. E. Piper
A. F. Piper

Inventors.
Albert C. Meady
Charles B. Bosworth.
by Singleton & Piper, atty's (No Model.) 2 Sheets—Sheet 2.

A. C. MEADY & C. B. BOSWORTH.
APPARATUS FOR GRADUATING AND TESTING PRESSURE GAGES.

No. 408,808. Patented Aug. 13, 1889.

Witnesses.
H. E. Piper
A. F. Piper

Inventors.
Albert C. Meady
Charles B. Bosworth
by Singleton & Piper, attys

UNITED STATES PATENT OFFICE.

ALBERT CECIL MEADY, OF SOMERVILLE, AND CHARLES B. BOSWORTH, OF EVERETT, ASSIGNORS TO THE CROSBY STEAM GAGE AND VALVE COMPANY, OF BOSTON, MASSACHUSETTS.

APPARATUS FOR GRADUATING AND TESTING PRESSURE-GAGES.

SPECIFICATION forming part of Letters Patent No. 408,808, dated August 13, 1889.

Application filed December 10, 1888. Serial No. 293,131. (No model.)

*To all whom it may concern:*

Be it known that we, ALBERT CECIL MEADY and CHARLES BARTLETT BOSWORTH, citizens of the United States, the former residing at Somerville and the latter at Everett, in the county of Middlesex and State of Massachusetts, have invented certain new and useful Improvements in Devices or Apparatus to be Employed in the Graduation or Testing of Pressure-Gages; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

Figure 1:
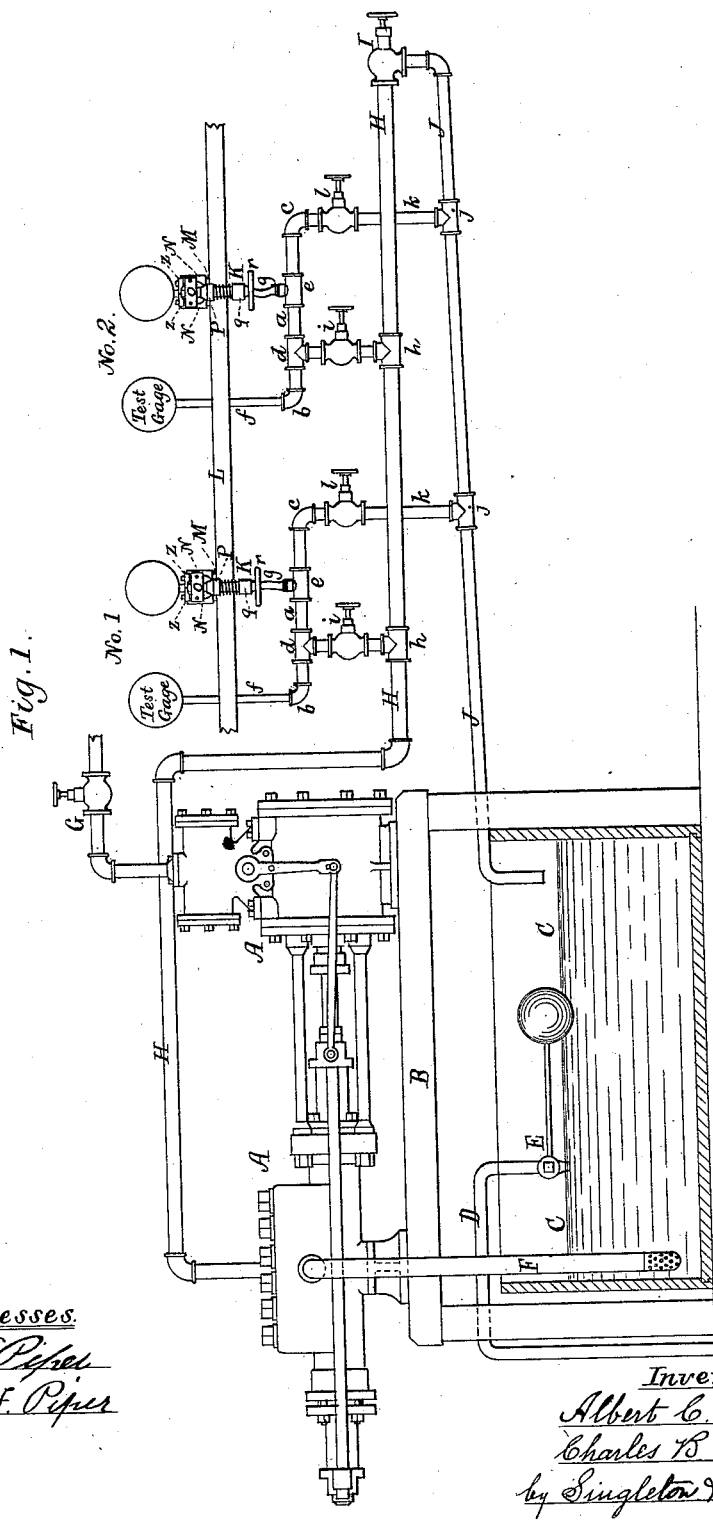
Figure 2:
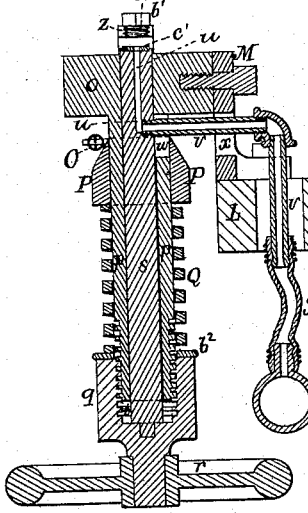
Figure 4:
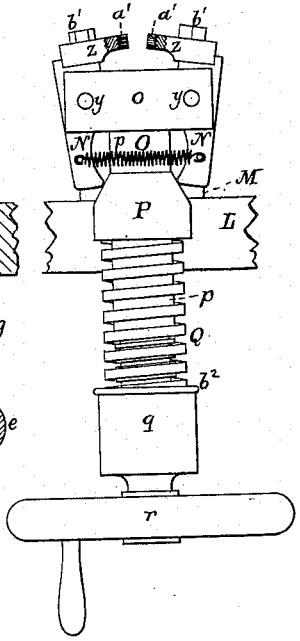
Figure 3:
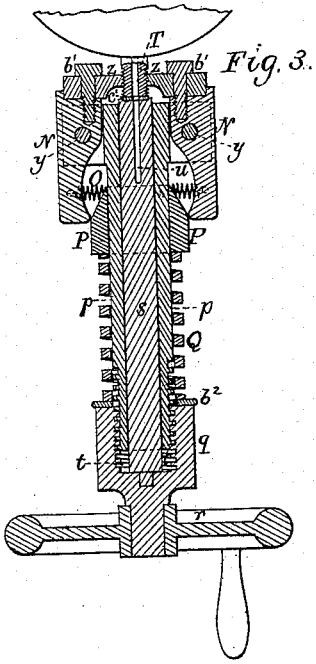
Figure 5:
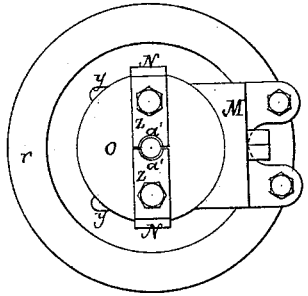

Figure 1 is an elevation, partly in section, of an apparatus for graduating or testing pressure-gages. Figs. 2 and 3 are vertical and median sections; Fig. 4, a side elevation; and Fig. 5, a top or plan view, on an enlarged scale, of the grip or device for holding a gage while being tested or graduated.

The object of our invention is to facilitate and expedite the graduation and testing of such gages; and with this view the arrangement of the devices employed is such as admits of the graduation or testing of a number of gages at the same time and for different pressures, notwithstanding their uniform attachment to a single pressure pipe or main upon which a constant pressure is maintained, while the gages operated upon may be attached or detached without disturbing the operation of any other gage under manipulation, as hereinafter explained.

To enable others skilled in the art to make and use our invention, we will proceed to describe the same, reference being had to the accompanying drawings, and to the letters of reference marked thereon.

In the drawings, A denotes a steam-pump for the supply of water under pressure required for the operation of the gages. The steam-pump is represented as mounted on a strong frame-work B, under which is situated a water-tank C, provided with a water-supply pipe D, having at its inner end a ball-cock E to regulate the influx of water. The suction-pipe F of the steam-pump A descends within the water-tank C to such a depth that its lower end is always below the surface of the water contained therein, and the pump is operated by steam, which enters its steam-valve chest by means of a suitable pipe and controlling-valve G. A water-pressure pipe H extending from the delivery-valve chest of the pump to the extreme opposite end of the attached pipe system terminates in an automatic relief-valve I, which controls the pressure therein by permitting any surplus of water injected by the pump to escape into a waste-pipe J, connecting with the water-tank C, from which it was originally drawn.

At suitable distances along the length of the pressure-pipe H is arranged in connection therewith a combined number of parts forming plants for the graduation and testing of pressure-gages. These plants are of uniform construction and may be repeated indefinitely. Only two are shown in the drawings, the same being designated "No. 1" and "No. 2;" but as many others as desired may be added by extending the pressure and waste pipes H and J to make room for their introduction. The combination of parts constituting a single plant consists of a small horizontal pipe *a*, having a quarter-turn at either end *b* and *c*, and two intermediate T's *d* and *e*. Upon the left-hand quarter-turn *b* the test-gage is mounted by means of a short pipe *f*, and to the right-hand T *e* the gage to be graduated or tested is connected by means of a short flexible pipe *g* and a grip or clamping device K, constructed essentially as follows: This clamping device is supported on a table L, arranged over the pipes *a*, by a bracket M, which is bolted to the head *o* of said device and to the table. Projecting from the head *o* is a cylindrical and tubular shank *p*, screw-threaded at its lower end to receive a nut *q*, provided with a hand-wheel *r* for revolving it. Within the shank *p* is a slide-rod *s*, which rests on the bottom of the chamber *t* in the nut, and in the upper part of said slide-rod, and opening through its side and its top, is a passage *u*, which connects, by means of the pipe *v*, secured to the slide-rod *s*, and passing through a slot *w* in the shank *p* and another slot *x* in the bracket M to the flexible pipe *g* before mentioned. Pivoted in the head $o$ at $y$ are levers N, provided with jaws $z$, fixed thereto, and having semicircular openings $a'$ in their inner ends, screw-grooved to receive and fit to the screw-thread on the short tube projecting from the gage. The lower arms of the levers N are connected by a spring O, and are caused by it to bear on the conically-shaped slide P, arranged to slide on the exterior of the shank $p$, and which rests on a spring Q, encircling the said shank and bearing at its lower end on the nut $q$, or on a washer $b^2$ thereon. The upper end of the rod $s$ is provided with a perforated leather or elastic washer $c'$, as shown.

To connect a gage to be tested to the grip or clamping device, place between the jaws $z\,z$, when in the position shown in Fig. 4, the short tube T of the gage. Then revolve the hand-wheel $r$, which will cause the slide P to advance and close the jaws upon the tube. The rod $s$ will also advance within the shank, and by continuing to revolve the nut $q$ said rod will bear its washer $c'$ against the end of the gage-tube and securely connect the passage $u$ in said rod $s$, communicating with the pipe $a$ of the apparatus by means of the pipes $v$ and $g$, to the passage in the gage-tube leading to the Bourdon tubes, the flexible pipe $g$ enabling the connection of the pressure-pipe and gage to be maintained during the movements of the slide-rod $s$.

When the tube T of the gage is formed with a screw-thread in its interior instead of on its exterior, as shown, the said exterior of the tube is to be provided with an annular groove, which is to receive a correspondingly-shaped bead projecting from the surface of the semicircular openings $a'$ in the jaws $z$, jaws provided with said bead being readily substituted for those having screw-grooves by removing the screw-bolts $b'$ and putting the former in the place of the latter.

Other means may be employed for operating the slide P and slide-rod S instead of the screw and nut, as shown, and we sometimes make use of the toggle-joint for the purpose.

The left-hand T $d$ is connected with a similar T $h$ in the pressure-pipe H by means of a suitable pipe and controlling-valve $i$, and the right-hand quarter-turn $e$ is connected with a T $j$ in the waste-pipe J by means of a suitable pipe $k$, having a controlling-valve $l$.

The operation is as follows: The pump A having been put in motion, water is drawn from the tank C and forced into the pressure-pipe H, so as to obtain the pressure desired; but when the pressure therein exceeds what is required the automatic relief-valve I opens, permitting the surplus water to return to the tank C through the waste-pipe J. In testing or marking gages, the controlling-valves $i$ and $l$ having been closed, the gage to be operated upon is mounted beside a test-gage, as shown in the drawings, and as hereinbefore described. The induction-valve $i$ is then slightly opened and the entering water is forced up into both gages simultaneously, exhibiting on the dial of each the pressure admitted. The graduations indicated are then marked upon the dial in accordance with the test-gage and the gage tested at once removed to enable the workman to proceed with the graduation or testing of other gages.

To enable the workman to remove the gage, the induction-valve $i$ is closed and the eduction-valve $l$ is opened, so as to relieve the gage of pressure; but a uniform pressure is maintained throughout the pressure-pipe H, which is common to all the plants employed.

Heretofore the pressure has been obtained by a hand-pump. With such a device only one or, at most, two gages could be operated upon. The operator could not maintain a steady increasing pressure, and when a given pressure was obtained it was almost impossible to hold it. With one hand occupied in pumping it was very difficult to manipulate the gages. With the present device this is all obviated. The device operates of itself and the operative is free to use both hands in his work on the gages.

Having thus fully described our invention, we wish it to be understood that we do not confine ourselves to the use of a steam-pump as a means of producing a water-pressure within the pressure-pipe H, as other sufficient means may be employed, which substitution would be equally a part of our invention.

What we claim as our invention, and desire to secure by Letters Patent, is—

1. In an apparatus for testing or graduating pressure-gages, the combination of a water-supply under pressure, a pressure-pipe leading therefrom and provided with connections for the gages to be graduated or tested, the relief-valve in the pressure-pipe, and the waste-pipe connected to the relief-valve, as set forth.

2. In an apparatus for testing or graduating pressure-gages, the combination of a water-supply under pressure, a pressure-pipe leading therefrom, the waste-pipe, and connections for the gages to be graduated or tested, each connection communicating both with the pressure-pipe and the waste-pipe, as set forth.

3. In an apparatus for testing or graduating pressure-gages, the combination of a water-supply under pressure, a pressure-pipe leading therefrom and provided with connections for the gages to be graduated or tested, such connections having a clamp for holding the gages, the relief-valve in the pressure-pipe, and the waste-pipe connected to the relief-valve, as set forth.

In testimony whereof we affix our signatures in presence of two witnesses.

ALBERT CECIL MEADY.
CHARLES B. BOSWORTH.

Witnesses:
S. N. PIPER,
W. H. PRESTON.